(12) United States Patent
Starner et al.

(10) Patent No.: US 8,963,806 B1
(45) Date of Patent: Feb. 24, 2015

(54) DEVICE AUTHENTICATION

(71) Applicant: Google Inc., Mountain View, CA (US)

(72) Inventors: Thad Eugene Starner, Mountain View, CA (US); Michael Patrick Johnson, Sunnyvale, CA (US); Antonio Bernardo Monteiro Costa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/663,294

(22) Filed: Oct. 29, 2012

(51) Int. Cl.
*G09G 5/00* (2006.01)

(52) U.S. Cl.
USPC ..................................... 345/8; 345/7

(58) Field of Classification Search
USPC .................. 345/7, 8; 716/4, 19; 382/115–124
See application file for complete search history.

(56) References Cited

U.S. PATENT DOCUMENTS

| | | | |
|---|---|---|---|
| 6,735,328 B1 | 5/2004 | Helbing et al. | |
| 7,925,887 B2 | 4/2011 | Burton | |
| 8,141,159 B2 | 3/2012 | Peled et al. | |
| 2003/0091215 A1* | 5/2003 | Lauper et al. | 382/117 |
| 2006/0029262 A1* | 2/2006 | Fujimatsu et al. | 382/117 |
| 2006/0115130 A1* | 6/2006 | Kozlay | 382/117 |
| 2008/0104415 A1 | 5/2008 | Palti-Wasserman et al. | |
| 2008/0137916 A1* | 6/2008 | Lauper et al. | 382/117 |
| 2008/0216171 A1 | 9/2008 | Sano et al. | |
| 2009/0083850 A1* | 3/2009 | Fadell et al. | 726/19 |
| 2013/0150004 A1* | 6/2013 | Rosen | 455/414.1 |
| 2014/0115696 A1* | 4/2014 | Fadell et al. | 726/19 |

* cited by examiner

*Primary Examiner* — Ricardo L Osorio
(74) *Attorney, Agent, or Firm* — McDonnell Boehnen Hulbert & Berghoff LLP

(57) ABSTRACT

A head-mountable device configured to authenticate a wearer is disclosed. The head-mountable device can receive an indication of an eye gesture from at least one proximity sensor in the head-mountable device configured to generate sensor data indicative of light reflected from an eye area. The head-mountable device can capture biometric information indicative of one or more biometric identifiers of a wearer of the head-mountable device responsive to receiving the indication of the eye gesture. The head-mountable device can authenticate the wearer of the head-mountable device based on a comparison of the captured biometric information and a stored biometric profile.

9 Claims, 12 Drawing Sheets

DEVICE AUTHENTICATION

BACKGROUND

A typical computer terminal facilitates user input to a computer and computer output to the user. The terminal may take the form of one or more input devices, such as a keyboard and a mouse, and one or more output devices, such as a display and a loudspeaker. The terminal may be integrated with the computer, which is typically the case for notebook computers and smartphones, or may be separate from the computer, which is often the case for desktop computers and thin clients.

A computer typically includes at least one authentication mechanism for verifying the identity of a user of a computer terminal before allowing the user to access to the computer. Authentication mechanisms generally fall into at least one of three categories: something known, something possessed, or something inherent.

A "something known" authentication mechanism typically takes the form of a password, a passphrase, a personal identification number (PIN), or a challenge response. For example, if the terminal user identifies herself as a given authorized user, the computer may request that the user input a password known only by the given user. If the password provided by the terminal user does not match a password stored in the computer and associated with the given user, then the computer may determine that the terminal is not the respective authorized user, and may deny the terminal user access to the computer. However, if the provided password matches the stored password associated with the given user, then the computer may allow the terminal user to access the computer via the computer terminal.

A "something possessed" authentication mechanism typically requires the computer-terminal user to prove that he or she physically possesses a security token. The security token could take the form of a smart card, universal serial bus (USB) key, Bluetooth device, or a radio-frequency identification (RFID) tag, among other examples. In one form, the computer-terminal user must physically connect the security token to the computer to prove possession of the security token. In another form, the security token presents (on an integrated liquid crystal display (LCD)) an authentication code according to an algorithm unique to (and known only to) the security token and the computer. By requiring the computer-terminal user to enter the authentication code, the computer can ensure that the user possesses the security token. A new authentication code is generated at an interval (e.g., every sixty seconds) to ensure that any given authentication code is unknown to any person except the possessor of the security token.

A "something inherent" security mechanism typically requires the computer terminal to measure or otherwise determine a characteristic unique to the computer-terminal user. This unique characteristic is often a biometric measurement, which can typically be classified as a physiological measurement or a behavioral characteristic.

A behavioral biometric measurement is typically a measurement of a behavior that is unique to the computer-terminal user. Accordingly, the behavioral measurement might take the form of voice or smile recognition, lip movement, signature verification, keystroke dynamics, mouse dynamics, and/or gait, among numerous other possibilities. For example, the computer might allow access to a computer-terminal user upon measuring the user's gait and determining that the measurement is consistent with an authorized user's gait.

A physiological biometric measurement is typically a measurement of a physical characteristic that is unique to the computer-terminal user. Accordingly, the physiological characteristic might to the form of the computer-terminal user's iris structure, face or hand geometry, heartbeat, and/or electrical activity of the heart (perhaps as measured via an electrocardiogram (ECG)), among numerous other possibilities. For example, the computer might allow access to a computer-terminal user upon measuring the user's iris structure and determining that the measurement is consistent with an authorized user's iris structure.

An authentication mechanism may require a combination of something known, something possessed, and something inherent. For example, the security mechanism might require both a security token and a password. Accordingly, if a non-authorized user found a lost or misplaced security token, that user would still be unable to obtain access the computer without the password. Similarly, if a non-authorized user obtained the password, that user would be unable to obtain access without the security token.

Many of the above-described authentication mechanisms, while appropriate for use with a desktop or notebook computer, are not well suited for use with a smaller computer terminal such as a head-mountable device (HMD). An HMD can be as small as a pair of glasses or as large as a helmet, and generally includes a very small image display element close enough to a wearer's eye(s) such that the displayed image fills or nearly fills the field of view, and appears as a normal sized image, such as might be displayed on a traditional image display device.

The HMD may include an array of sensors to facilitate input, such as a microphone for speech recognition, a camera for image detection, and an accelerometer for vibration detection, among numerous other possibilities. However, because a typical HMD does not include a physical keyboard, the HMD may have to provide an alternative mechanism for allowing input of "something known," such as a password. Though HMD could allow the user to speak his or her password, a bystander might overhear the password, which could then be used by the bystander to obtain access to the computer. Accordingly, HMD-appropriate authentication mechanisms are desired.

SUMMARY

Some embodiments of the present disclosure provide a method include receiving an indication of an eye gesture from at least one proximity sensor in a head-mountable device configured to generate sensor data indicative of light reflected from an eye area. The method can include capturing biometric information indicative of one or more biometric identifiers of a wearer of the head-mountable device responsive to receiving the indication of the eye gesture. The method can include authenticating the wearer of the head-mountable device based on a comparison of the captured biometric information and a stored biometric profile.

Some embodiments of the present disclosure provide a head-mountable-device including an eye gesture detection system, a biometric identifier characterization system, and a controller. The eye gesture detection system can include at least one light source configured to illuminate an eye area and at least one proximity sensor configured to generate sensor data indicative of light reflected from the eye area. The biometric identifier characterization system can include at least one sensor configured to generate data indicative of a biometric identifier of a wearer of the head-mountable device. The controller can be configured to receive an indication of an eye gesture from the eye gesture detection system. The controller can also be configured to cause the biometric identifier characterization system to capture biometric information indicative of one or more biometric identifiers of the wearer responsive to receiving the indication of the eye gesture. The controller can also be configured to authenticate the wearer of the head-mountable device based on the captured biometric information and based on a stored biometric profile.

Some embodiments of the present disclosure provide a non-transitory computer readable medium storing instructions that, when executed by one or more processors in a computing device, cause the computing device to perform operations. The operations can include receiving an indication of an eye gesture from at least one proximity sensor in a head-mountable device configured to generate sensor data indicative of light reflected from an eye area. The operations can include responsive to receiving the indication of the eye gesture, capturing biometric information indicative of one or more biometric identifiers of a wearer of the head-mountable device. The operations can include authenticating the wearer of the head-mountable device based on the captured biometric information and based on a stored biometric profile.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

Figure 1A:
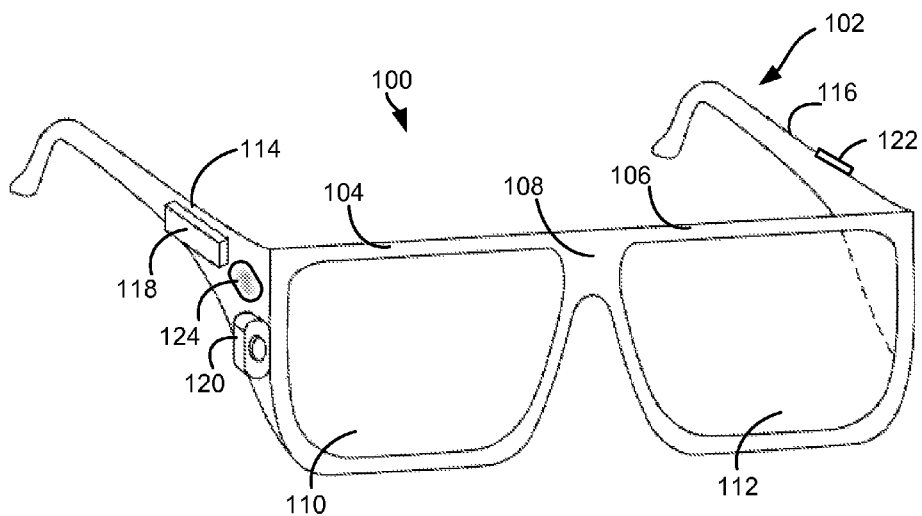
FIGS. 1A-1E illustrate examples of wearable computing systems.

In the following detailed description, reference is made to the accompanying figures, which form a part thereof. In the figures, similar symbols typically identify similar components, unless context dictates otherwise. Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and designed in a wide variety of different configurations, all of which are contemplated herein.

I. Overview

A wearable computing system, such as a head-mountable device (HMD) can include a number of sensors and devices to allow the HMD user (wearer) to interact with the HMD. Unlike a desktop computer terminal, an HMD generally does not include a keyboard or pointer user-interface similar to a mouse, but can include a number of input/output devices not generally employed in a desktop computing environment, such as an eye proximity sensor for detecting eye gestures, an accelerometer for detecting HMD movement and/or vibration, and/or a microphone for detecting sounds such as speech by the wearer, among other examples.

User authentication on many computing platforms requires that the user provide "something known" for authentication, such as a password. When the computer terminal includes a traditional keyboard or mouse for receiving user inputs, the user can use such input devices to discreetly convey the known information to the computing platform to authenticate. However, in the case of an HMD, an alternative authentication procedure is desired to convey known information for authenticating the user, because the HMD does not generally include input devices that allow for discreetly conveying known authentication information, such as a password. For example, a password input by voice recognition could be overheard by a bystander if the HMD user is in a public place.

Some embodiments of the present disclosure provide a biometric authentication procedure for an HMD that is initiated by detecting an eye gesture by the wearer, such as a wink gesture, for example. Detection of the eye gesture initiates the authentication procedure and indicates that the HMD should record additional and/or subsequent biometric authentication information. For example, upon detecting the eye gesture, the HMD can receive physiological biometric information from additional biometric characterization sensor(s) to characterize a voice pattern, a vibration pattern associated with speech, and/or a head vibration response, and/or could prompt the user to provide behavior biometric information, such as a hand geometry (when the hand is placed in the range of a biometric characterization sensor). Thus, the biometric characterization sensor(s) can include, for example, a microphone for recording acoustic information indicative of a speech pattern, a camera for recording an image indicative of a hand geometry, an accelerometer for sensing vibrations associated with a wearer's speech, and/or a vibration transducer, such as a bone conduction transducer, for vibrating against a wearer's head such that an accelerometer can detect the vibration response of the wearer's head.

Moreover, some embodiments of the present disclosure provide for characterizing the eye gesture detected by the user and employing information characterizing the eye gesture as a secondary biometric authenticator. For example, when the detected eye gesture is a wink, the wink gesture of the wearer can be characterized according to data from an eye proximity sensor that outputs information related to the time-dependent reflectivity of the eye area of the wearer. Individual wearers can be associated with identifiable characteristics in such wink-gesture data and wearers can thereby be distinguished from one another using such information alone or in combination with additional biometric characterization information.

The detected biometric identifiers can be compared with a stored biometric profile that corresponds to an authorized user to determine whether the wearer is authorized to use the HMD (e.g., authenticate the wearer). For example, the wink gesture data can be compared with a stored profile of a wink gesture for an authorized user, and voice pattern data can be compared with a stored profile of a voice pattern profile for the authorized user. In some examples, the wearer is authenticated, and authorized to use the device, only where multiple biometric characteristics are aligned with the biometric profile (e.g., both a wink gesture and a voice pattern).

The biometric characterization information detected by the HMD to authenticate the wearer can be any combination of behavioral biometrics and/or physiological biometrics. Further, the biometric characterization information can be generated by the user voluntarily or involuntarily. For example, in voice recognition, a voice pattern can be detected only when the user speaks and in wink gesture recognition, a wink gesture can be detected only when the user winks. On the other hand, in hand geometry recognition or head vibration response recognition, the relevant biometric characteristics are exhibited by a user involuntarily (although the user may still cooperate in making their hand visible to the camera, for example).

II. Exemplary Head-Mountable Display

FIG. 1A illustrates an example of a wearable computing system 100. The wearable computing system 100 includes a proximity-sensing system 136 and an image-capturing system 120. While FIG. 1A illustrates a head-mountable device (HMD) 102 as an example of a wearable computing system, other types of wearable computing systems could be used. As illustrated in FIG. 1A, the HMD 102 includes frame elements, including lens frames 104, 106 and a center frame support 108, lens elements 110, 112, and extending side arms 114, 116. The center frame support 108 and the extending side arms 114, 116 are configured to secure the HMD 102 to a user's face via a user's nose and ears.

Each of the frame elements 104, 106, and 108 and the extending side arms 114, 116 can be formed of a solid structure of plastic and/or metal, or can be formed of a hollow structure of similar material so as to allow wiring and component interconnects to be internally routed through the HMD 102. Other materials can be used as well.

The lens elements 110, 112 can be formed of any material that can suitably display a projected image or graphic. Each of the lens elements 110, 112 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side arms 114, 116 can each be projections that extend away from the lens frames 104, 106, respectively, and can be positioned behind a user's ears to secure the HMD 102 to the user. The extending side arms 114, 116 can further secure the HMD 102 to the user by extending around a rear portion of the user's head. The wearable computing system 100 can also or instead connect to or be affixed within a head-mountable helmet structure.

The HMD 102 can include an on-board computing system 118, a video camera 120, a sensor 122, and a finger-operable touch pad 124. The on-board computing system 118 is shown to be positioned on the extending side arm 114 of the HMD 102. The on-board computing system 118 can be provided on other parts of the HMD 102 or can be positioned remote from the HMD 102. For example, the on-board computing system 118 could be wire- or wirelessly-connected to the HMD 102.

The on-board computing system 118 can include a processor and memory, for example. The on-board computing system 118 can be configured to receive and analyze data from the video camera 120 and the finger-operable touch pad 124 (and possibly from other sensory devices, user interfaces, or both) and generate images for output by the lens elements 110 and 112. The on-board computing system can take the form of the computing device, among other possibilities.

With continued reference to FIG. 1A, the video camera 120 is shown positioned on the extending side arm 114 of the HMD 102; however, the video camera 120 can be provided on other parts of the HMD 102. The video camera 120 can be configured to capture image data at various resolutions or at different frame rates. One or multiple video cameras with a small form factor, such as those used in cell phones or webcams, for example, can be incorporated into the HMD 102.

Further, although FIG. 1A illustrates one video camera 120, more video cameras can be used, and each can be configured to capture the same view, or to capture different views. For example, the video camera 120 can be forward facing to capture at least a portion of the real-world view perceived by the user. The image data captured by the video camera 120 can then be used to generate an augmented reality where computer generated images appear to interact with the real-world view perceived by the user.

The sensor 122 is shown on the extending side arm 116 of the HMD 102; however, the sensor 122 can be positioned on other parts of the HMD 102. The sensor 122 can include one or more of a gyroscope, an accelerometer, or a proximity sensor, for example. Other sensing devices can be included within, or in addition to, the sensor 122 or other sensing functions can be performed by the sensor 122.

The finger-operable touch pad 124 is shown on the extending side arm 114 of the HMD 102. However, the finger-operable touch pad 124 can be positioned on other parts of the HMD 102. Also, more than one finger-operable touch pad can be present on the HMD 102. The finger-operable touch pad 124 can be used by a user to input commands. The finger-operable touch pad 124 can sense at least one of a position and a movement of a finger via capacitive sensing, resistance sensing, or a surface acoustic wave process, among other possibilities. The finger-operable touch pad 124 can be capable of sensing finger movement in a direction parallel or planar to the pad surface, in a direction normal to the pad surface, or both, and can also be capable of sensing a level of pressure applied to the pad surface. The finger-operable touch pad 124 can be formed of one or more translucent or transparent insulating layers and one or more translucent or transparent conducting layers. Edges of the finger-operable touch pad 124 can be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad can be operated independently, and can provide a different function.

Figure 1B:
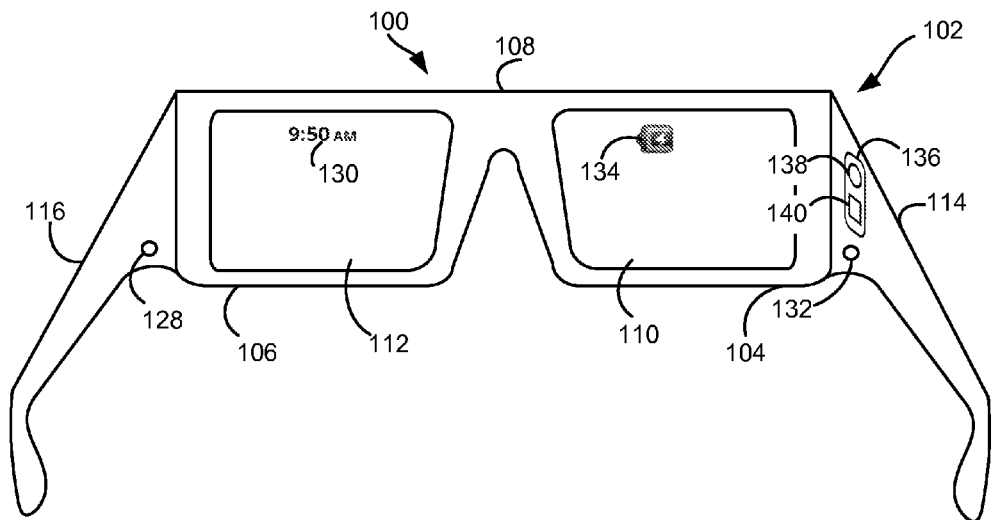

FIG. 1B illustrates an alternate view of the wearable computing system 100 illustrated in FIG. 1A. As shown in FIG. 1B, the lens elements 110, 112 can act as display elements. The HMD 102 can include a first projector 128 coupled to an inside surface of the extending side arm 116 and configured to project a display 130 onto an inside surface of the lens element 112. A second projector 132 can be coupled to an inside surface of the extending side arm 114 and can be configured to project a display 134 onto an inside surface of the lens element 110.

The lens elements 110, 112 can act as a combiner in a light projection system and can include a coating that reflects the light projected onto them from the projectors 128, 132. In some embodiments, a reflective coating may not be used (such as, for example, when the projectors 128, 132 are scanning laser devices).

In some embodiments, other types of display elements can also be used. For example, the lens elements 110, 112 themselves can include one or more transparent or semi-transparent matrix displays (such as an electroluminescent display or a liquid crystal display), one or more waveguides for delivering an image to the user's eyes, or one or more other optical elements capable of delivering an in focus near-to-eye image to the user. A corresponding display driver can be disposed within the frame elements 104, 106 for driving such a matrix display. Alternatively or additionally, a laser or LED source and scanning system could be used to draw a raster display directly onto the retina of one or more of the user's eyes.

The proximity-sensing system 136 includes a light source 138 and a light sensor 140 affixed to the extending side arm 114 of the HMD 102. The proximity-sensing system 136 can include elements other than those shown in FIG. 1B. Additionally, the proximity-sensing system 136 can be arranged in other ways. For example, the light source 138 can be mounted separately from the light sensor 140. As another example, the proximity-sensing system 136 can be mounted to other frame elements of the HMD 102, such as, for example, to the lens frames 104 or 106, to the center frame support 108, or to the extending side arm 116.

Figure 1C:
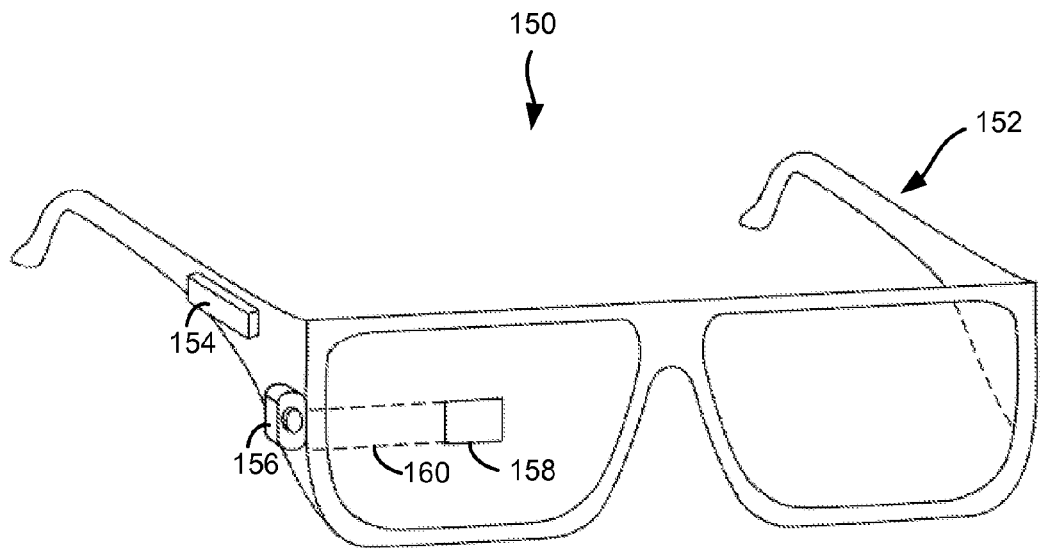

FIG. 1C illustrates another example of a wearable computing system 150. The wearable computing system 150 includes an image-capturing system 156. The wearable computing system 150 can be coupled to a proximity-sensing system, although a proximity-sensing system is not shown in FIG. 1C. While FIG. 1C illustrates an HMD 152 as an example of a wearable computing system, other types of wearable computing systems could be used. The HMD 152 can include frame elements and side arms such as those discussed above in connection with FIGS. 1A and 1B. The HMD 152 can also include an on-board computing system 154 and a video camera 156, such as those discussed above in connection with FIGS. 1A and 1B. As shown, the video camera 156 is mounted on a frame of the HMD 152; however, the video camera 156 can be mounted at other positions as well.

As shown in FIG. 1C, the HMD 152 can include a single display 158, which can be coupled to the HMD. The display 158 can be formed on one of the lens elements of the HMD 152, such as a lens element having a configuration as discussed above in connection with FIGS. 1A and 1B. The display 158 can be configured to overlay computer-generated graphics in the user's view of the physical world. The display 158 is shown to be provided in a center of a lens of the HMD 152; however, the display 158 can be provided in other positions. The display 158 is controllable via the computing system 154, which is coupled to the display 158 via an optical waveguide 160.

Figure 1D:
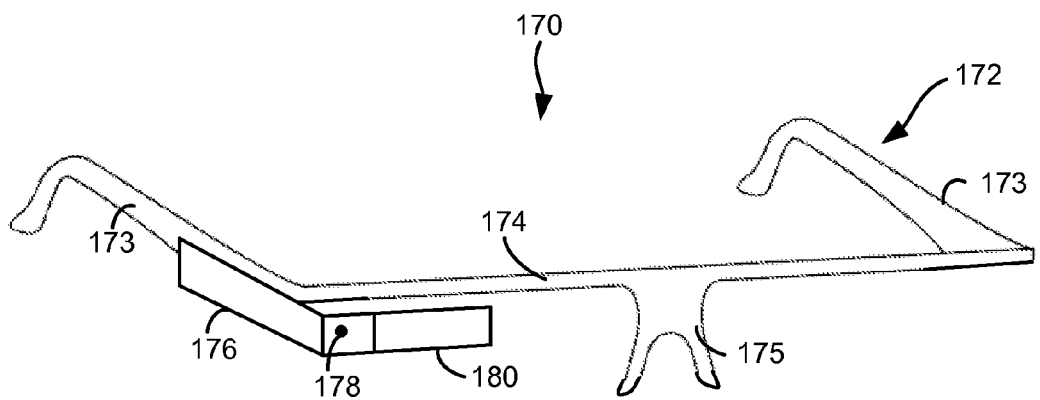

FIG. 1D illustrates another example of a wearable computing system 170. The wearable computing system 170 can include an image-capturing system 178 and a proximity-sensing system (not shown in FIG. 1D). The wearable computing system 170 is shown in the form of an HMD 172; however, the wearable computing system 170 can take other forms as well. The HMD 172 can include side arms 173, a center frame support 174, and a bridge portion with a nosepiece 175. In the example shown in FIG. 1D, the center frame support 174 connects the side arms 173. The HMD 172 does not include lens-frames containing lens elements. The HMD 172 can also include an on-board computing system 176 and a video camera 178, such as those discussed above in connection with FIGS. 1A and 1B.

The HMD 172 can include a single lens element 180, which can be coupled to one of the side arms 173 or to the center frame support 174. The lens element 180 can include a display, such as the display discussed above in connection with FIGS. 1A and 1B. The lens element 180 can be configured to overlay computer-generated graphics upon the user's view of the physical world. In an example, the single lens element 180 can be coupled to the inner side (the side exposed to a portion of a user's head when worn by the user) of the extending side arm 173. The single lens element 180 can be positioned in front of or proximate to a user's eye when the user wears the HMD 172. For example, the single lens element 180 can be positioned below the center frame support 174, as shown in FIG. 1D.

Figure 1E:
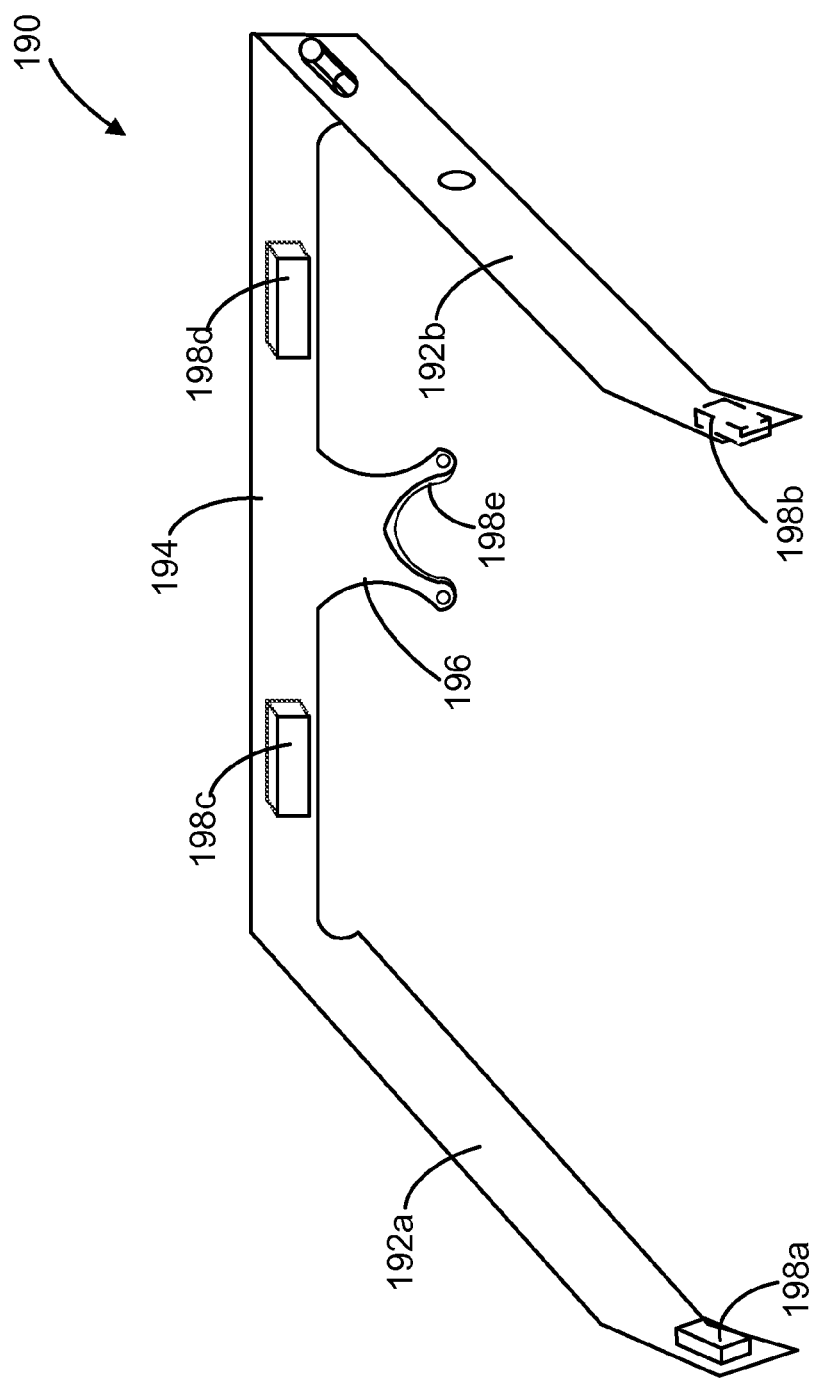

FIG. 1E is a simplified illustration of an example head-mountable device ("HMD") 190 configured for bone-conduction audio. As shown, the HMD 190 includes an eyeglass-style frame comprising two side-arms 192*a-b*, a center frame support 194, and a nose bridge 196. The side-arms 192*a-b* are connected by the center frame support 194 and arranged to fit behind a wearer's ears. The HMD 190 includes vibration transducers 198*a-e* that are configured to function as bone-conduction transducers. In some examples, one or more of the vibration transducers 198*a-e* vibrate anvils configured to interface with a bony portion of the wearer's head to thereby convey acoustic signals through the wearer's jaw and/or skull when the vibration transducers 198*a-e* vibrate with respect to the frame of the HMD 190. Additionally or alternatively, it is noted that bone conduction audio can be conveyed to a wearer through vibration of any portion of the HMD 190 that contacts the wearer so as to transmit vibrations to the wearer's bone structure. For example, in some embodiments of the present disclosure, one or more of the vibration transducers 198*a-e* can operate without driving an anvil, and instead couple to the frame of the HMD 190 to cause the side-arms 192*a-b*, center frame support 194, and/or nose bridge 196 to vibrate against the wearer's head.

The vibration transducers 198*a-e* are securely connected to the HMD 190 and can optionally be wholly or partially embedded in the frame elements of the HMD 190 (e.g., the side-arms 192*a-b*, center frame support 194, and/or nose bridge 196). For example, vibration transducers 198*a*, 198*b* can be embedded in the side-arms 192*a-b* of HMD 190. In an example embodiment, the side-arms 192*a-b* are configured such that when a wearer wears HMD 190, one or more portions of the eyeglass-style frame are configured to contact the wearer at one or more locations on the side of the wearer's head. For example, side-arms 192*a-b* can contact the wearer at or near the wearer's ear and the side of the wearer's head. Accordingly, vibration transducers 198*a*, 198*b* can be embedded on the inward-facing side (toward the wearer's head) of the side-arms 192*a-b* to vibrate the wearer's bone structure and transfer vibration to the wearer via contact points on the wearer's ear, the wearer's temple, or any other point where the side-arms 192*a-b* contact the wearer.

Vibration transducers 198*c*, 198*d* are embedded in the center frame support 194 of HMD 190. In an example embodiment, the center frame support 194 is configured such that when a wearer wears HMD 190, one or more portions of the eyeglass-style frame are configured to contact the wearer at one or more locations on the front of the wearer's head. Vibration transducers 198*c*, 198*d* can vibrate the wearer's bone structure, transferring vibration via contact points on the wearer's eyebrows or any other point where the center frame support 194 contacts the wearer. Other points of contact are also possible.

In some examples, the vibration transducer 198e is embedded in the nose bridge 196 of the HMD 190. The nose bridge 196 is configured such that when a user wears the HMD 190, one or more portions of the eyeglass-style frame are configured to contact the wearer at one or more locations at or near the wearer's nose. Vibration transducer 198e can vibrate the wearer's bone structure, transferring vibration via contact points between the wearer's nose and the nose bridge 196, such as points where the nose bridge 196 rests on the wearer's face while the HMD 190 is mounted to the wearer's head.

When there is space between one or more of the vibration transducers 198a-e and the wearer, some vibrations from the vibration transducer can also be transmitted through air, and thus may be received by the wearer over the air. That is, in addition to sound perceived due to bone conduction, the wearer may also perceive sound resulting from acoustic waves generated in the air surrounding the vibration transducers 198a-e which reach the wearer's outer ear and stimulate the wearer's tympanic membrane. In such an example, the sound that is transmitted through air and perceived using tympanic hearing can complement sound perceived via bone-conduction hearing. Furthermore, while the sound transmitted through air can enhance the sound perceived by the wearer, the sound transmitted through air can be sufficiently discreet as to be unintelligible to others located nearby, which can be due in part to a volume setting.

In some embodiments, the vibration transducers 198a-e are embedded in the HMD 190 along with a vibration isolating layer (not shown) in the support structure of the HMD 190 (e.g., the frame components). For example, the vibration transducer 198a can be attached to a vibration isolation layer, and the vibration isolation layer can be connected to the HMD 190 frame (e.g., the side-arms 192a-b, center frame support 194, and/or nose bridge 196). In some examples, the vibration isolating layer is configured to reduce audio leakage to a wearer's surrounding environment by reducing the amplitude of vibrations transferred from the vibration transducers to air in the surrounding environment, either directly or through vibration of the HMD 190 frame components.

Figure 2:
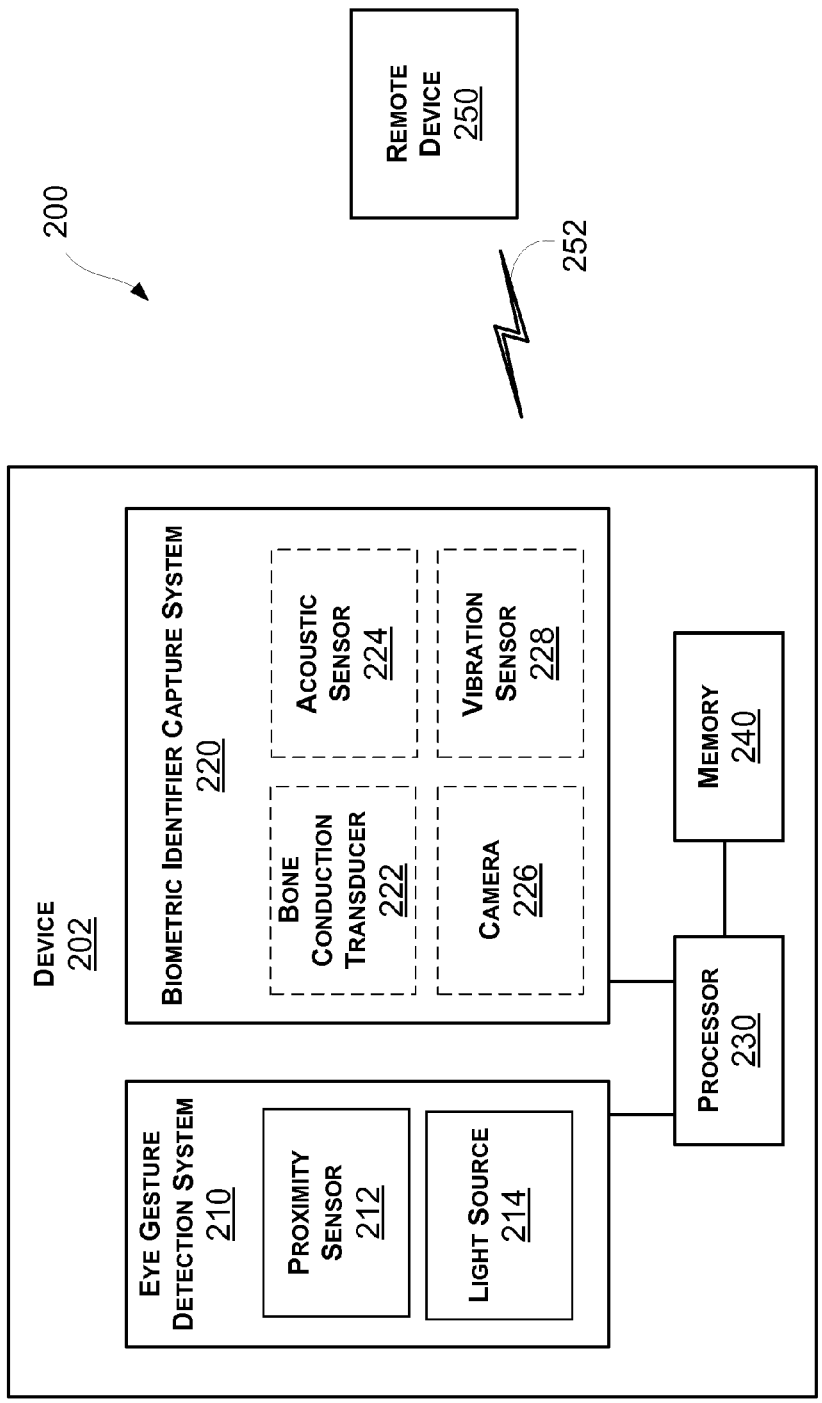
FIG. 2 illustrates an example of a wearable computing system including biometric sensing systems.

FIG. 2 illustrates an example of a wearable computing system 200 that includes a wearable computing device 202. As shown, wearable computing device 202 includes an eye gesture detection system 210, a biometric capture system 220, a processor 230, and memory 240. The eye gesture detection system 210 includes a proximity sensor 212 and a light source 214, and is further described with reference to FIGS. 3A-3B.

Biometric identifier capture system 220 includes a bone conduction transducer 222, an acoustic sensor 224, a camera 226, and a vibration sensor 228. Bone conduction transducer 222 is designed to receive electrical signals to generate varying magnetic fields with an electromagnet and thereby produce corresponding oscillations in a magnetic diaphragm. When placed against a bony structure of the head, the oscillating diaphragm creates vibrations in the skull that propagate to the inner ear and cause sound to be perceived by the wearer of the device 202. The bone conduction transducer 222 can be similar to the vibration transducers 198a-e discussed above in connection with FIG. 1E, for example.

Acoustic sensor 224 may be any device capable of detecting and/or recording sound, perhaps by converting sound waves to an electrical signal and storing that signal in memory 240. As such, acoustic sensor 224 may comprise one or more components or devices such as a microphone and/or a data storage. In an embodiment, acoustic sensor 224 is able to determine when an individual (such as a user of device 202) is speaking, perhaps using voice-recognition techniques, sound-recognition techniques, and/or one or more other alternatives.

Camera 226 may take the form of a CCD and/or a CMOS imager, among other possibilities. The camera may be able to take video and/or still images, as examples. In an embodiment, the camera may be configured to track a field of view of device 202. Camera 226 may take a form similar to that of video camera 120 discussed above in connection with FIG. 1E, for example.

Vibration sensor 228 could take the form of a gyroscope and/or an accelerometer, among other examples. The gyroscope could be capable of measuring an orientation of device 202, among other device characteristics. The accelerometer could be a single- and/or multi-axis accelerometer, and may be capable of detecting the magnitude and direction of acceleration of device 202. Those having skill in the art will understand that vibration sensor 228 could take the form of any other device capable of detecting, measuring, etc. the vibration of device 202.

Processor 230 may be, for example, a general-purpose microprocessor and/or a discrete signal processor. Though processor 230 is described here as a single processor, those having skill in the art will recognize that device 202 may contain multiple (e.g., parallel) processors. Memory 240 may store software code that is executable by processor 230 to carry out various functions described herein. Alternatively, some or all of the functions could instead be implemented through hardware, firmware, etc.

As shown in FIG. 2, device 202 communicates with a remote device 250 using a communication link 252. The remote device 250 may be any type of computing device or transmitter including a laptop computer, a mobile telephone, or tablet computing device, etc., that is configured to communicate data to device 202. Remote device 250 and/or wearable device 202 may contain hardware, such as processors, transmitters, receivers, antennas, etc., to facilitate communication over link 252.

In FIG. 2, communication link 252 is illustrated as a wireless connection; however, wired connections may also be used. For example, communication link 252 may be a wired serial bus such as a universal serial bus or a parallel bus. The wired connection may be a proprietary connection as well. Communication link 252 may also be a wireless connection using, e.g., Bluetooth radio technology, communication protocols described in IEEE 802.11 (including any IEEE 802.11 revisions), Cellular technology (such as GSM, CDMA, UMTS, EV-DO, WiMAX, or LTE), or ZigBee technology, among other possibilities. The remote device 250 may be accessible via the Internet and may include a computing cluster associated with a particular web service (e.g., social-networking, photo sharing, address book, etc.).

Wearable computing device 202 could take the form of an HMD (such as HMD 102), among other possibilities. Those having skill in the art will understand that additional, fewer, and or different elements may be present in system 200, wearable device 202, eye gesture system 210, biometric identifier capture system 220, or any other system, entity, or element without departing from the scope of the claims.

III. Eye Gesture Sensing System

Figure 3A:
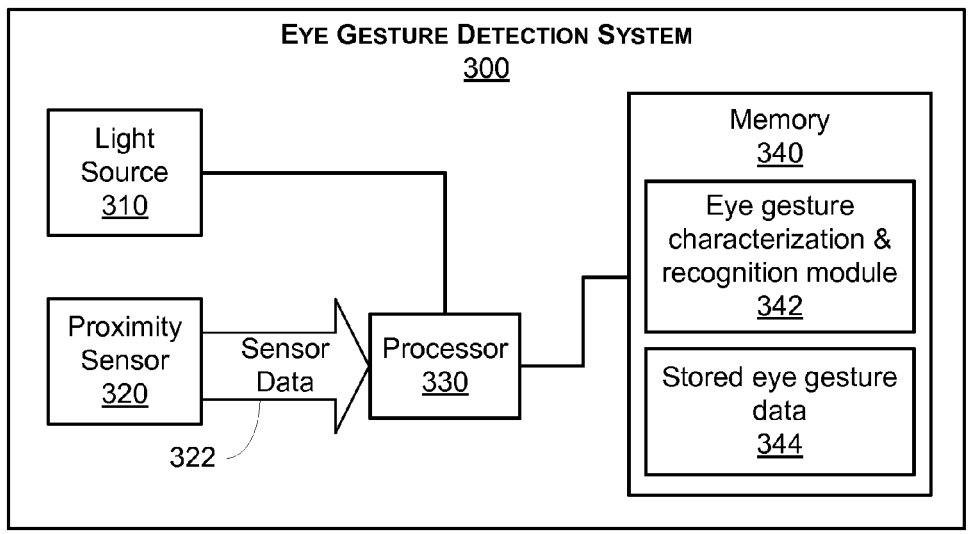
FIGS. 3A-3B illustrate an example of an arrangement of an eye gesture sensing system.
Figure 3B:
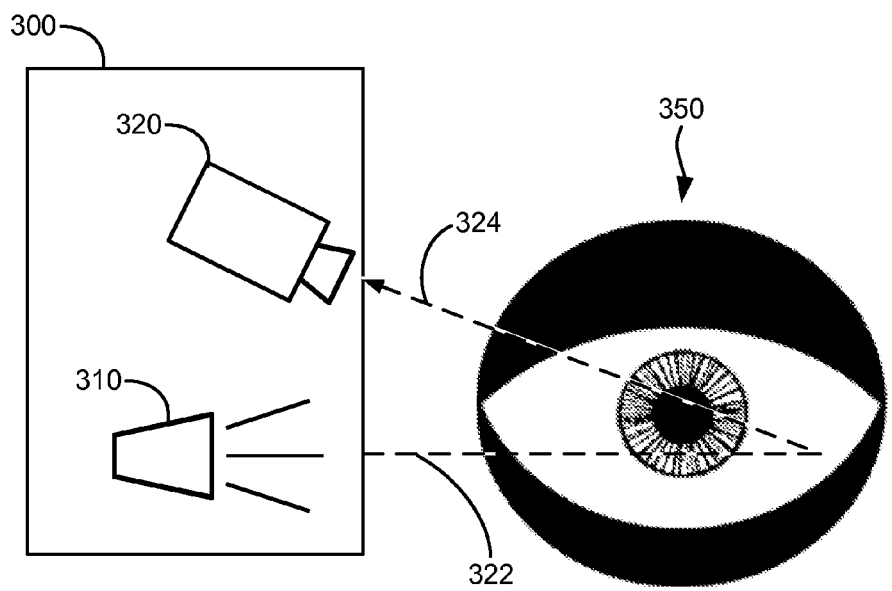

FIGS. 3A-3B illustrate an exemplary eye gesture detection system of an HMD or other wearable device. As shown in FIG. 3A, system 300 includes a light source 310, a proximity sensor 320, a processor 330, and a memory 340 storing (i) eye gesture characterization and recognition module 342 and (ii)

eye gesture data 344. And as shown in FIG. 3B, when the HMD is worn, light source 310 provides light to an eye area of the HMD wearer. An "eye area" may be observable area of a human eye, an observable area near the eye, or both. To this end, the eye area can include a peripheral eye area, an interior eye area, an area near the eye, or a combination of these. Examples of peripheral eye areas include the eye's sclera, cornea, and limbus. An example of an interior area of the eye is the eye's iris. And examples of areas near the eye include the eyelids, other skin near the eye, and eyelashes.

Light source 310 can include any suitable device or combination of devices that is capable of providing light. To this end, light source 310 can include one or more devices such as a light emitting diode, a laser diode, an incandescent source, a gas discharge source, or a combination of these, among others.

In operation, light source 310 can emit any suitable form of light. The light can be in the human visible range or outside that range. For example, the light can be near-infrared light. Note that infrared light and other forms of light outside the human visible range can be transmitted to an eye area of an HMD's wearer without potentially irritating the HMD's wearer. For ease of explanation, several examples in this disclosure discuss light in the infrared range.

Light source 310 can provide light to an entire eye area or to a portion of the eye area. The size of the eye area to which light source 310 provides light is termed the "spot size." For example, light source 310 can provide light such that the spot size covers at least a portion of the upper eyelid both when the eye is in an open state and when it is in a closed state. As another example, light source 310 can provide light such that the spot size covers at least a portion of the eye's cornea when the eye is oriented in a forward-facing direction, and such that the spot size covers at least a portion of the eye's sclera when the eye is oriented in another direction.

If eye-gesture detection system 300 includes multiple light sources, then the light sources can differ in the spot sizes of the light they provide. For example, one light source can provide light with a spot size that covers the entire eye area, whereas another light source can provide light with a spot size that covers just a portion of the eye area. In other words, one light source can provide light to the entire eye area, and another light source can provide light to a portion of the eye area.

In an implementation, light source 310 can use modulated or pulsed light. Doing so can help to distinguish light provided by light source 310 from ambient light or light provided by another light source (when there are multiple light sources). Note that light source 310 can use another light characteristic to distinguish the light it emits from other types of light; examples of light characteristics include frequency and light intensity.

Proximity sensor 320 receives light that is reflected from the eye area and, in response, generates sensor data 322 that represents a measurable change corresponding to a change in a characteristic of the received light. "Reflected" light may include a variety of interactions between light and the eye area, including those interactions that direct the light away from the eye area. Examples of such interactions include mirror reflection, diffuse reflection, and refraction, among other light scattering processes.

Proximity sensor 320 can include any suitable device or combination of devices that is capable of receiving light and, in response, generating sensor data that represents a measurable change corresponding to a change in a characteristic of the received light. To this end, proximity sensor 320 can include one or more devices such as a photodiode, an electro-optical sensor, a fiber-optic sensor, a photo-detector, or a combination of these, among others.

Proximity sensor 320 can be positioned in a way that permits it to detect light that is reflected from certain portions of an eye area. For example, proximity sensor 320 can be positioned above an eye. So positioned, proximity sensor 320 can detect light that is reflected from the top of the eye when the eye is open, and can detect light that is reflected from the top eyelid when the eye is closed. As another example, proximity sensor 320 can be positioned at an oblique angle with respect to the eye area. For instance, proximity sensor 320 can be positioned similar to the sensor 140 shown in FIG. 1B. As another example, proximity sensor 320 can be positioned so that it can focus on the center of the eye area.

In operation, when proximity sensor 320 receives light, proximity sensor 320 can generate sensor data 322 that is indicative of the received light. In an implementation, sensor data 322 represents the intensity of the received light as a function of time, though the sensor data could represent different and/or additional characteristics of the received light, such as frequency, polarization, coherence, phase, spectral width, modulation, or a combination of these, among other characteristics.

When eye gesture sensing system 300 includes multiple light sources, the generated data can take various forms. For example, proximity sensor 320 or another system can combine received light from all of the light sources in a way that a single curve represents the combined light. As another example, the generated data from proximity sensor 320 can include separate data sets, with each data set representing light from a separate light source.

Like light source 310, proximity sensor 320 can operate in connection with any suitable form of light, whether that light is in the human visible range or outside that range. In addition, proximity sensor 320 or another system can perform calibrations based on the received light. For example, when light source 310 and proximity sensor 320 operate on a common frequency range of light, such as infrared light, proximity sensor 320 or another system can filter out light that is not in that range. This can reduce noise in the data that proximity sensor 320 generates. As another example, when proximity sensor 320 receives light with relatively low intensity levels, proximity sensor 320 or another system can adjust the sensitivity of proximity sensor 320.

Proximity sensor 320 can operate in connection with light frequencies and intensities in various ways. In an implementation, proximity sensor 320 operates on a specified range of frequencies or intensities to the exclusion of frequencies or intensities that are outside that range. In another implementation, proximity sensor 320 has a granularity that is higher for a specified range of frequencies or intensities than for frequencies or intensities that are outside that range.

Of course, when light source 310 uses modulated or pulsed light, proximity sensor 320 not only can receive the modulated or pulsed light, but also can distinguish the modulated or pulsed light from other types of light.

FIG. 3B illustrates an example of an arrangement of eye gesture detection system 300 interacting with an eye area 350 while an eye is open. Light source 310 provides light to the sclera or to a larger portion of the eye area 350. Reference numeral 322 indicates the light provided to eye area 350. Proximity sensor 320 receives light that is reflected from eye area 350; the reflected light can include some or all of the light from light source 310. Reference numeral 324 indicates the light reflected from eye area 350.

It should be understood that each of the light sources and proximity sensors can be arranged in any suitable manner so long as eye gesture detection system 300 is able to accomplish the disclosed functionality.

When light is reflected from an eye area, its intensity generally depends on light-scattering characteristics of the eye area. Light-scattering characteristics of human skin (such as an eyelid) tend to be different from light-scattering characteristics of eye tissues (such as tissues of a cornea). Therefore, intensities of light reflected from skin tend to be higher than intensities of light reflected from an eye. Further, the flatness of skin tends to affect the skin's light-scattering characteristics. In particular, intensities of light reflected from an area with wrinkled skin tend to be higher than intensities of light reflected from an area with relatively flat skin.

Figure 4A:
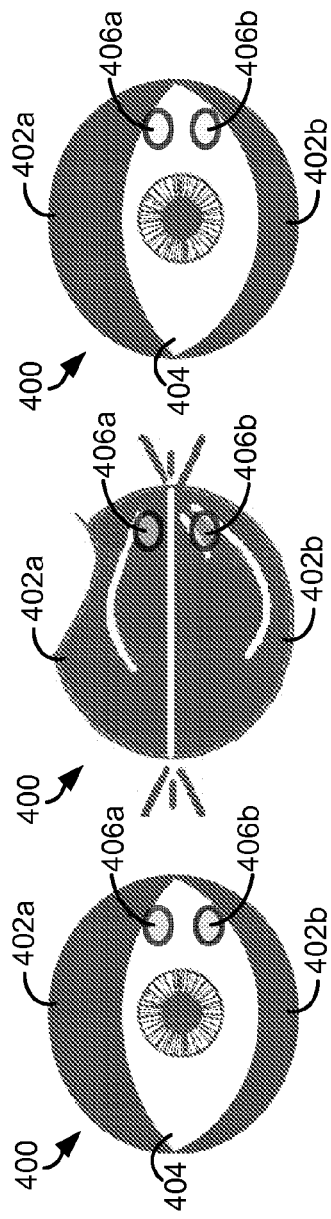
FIG. 4A illustrates a wink gesture of the eye area.

FIG. 4A illustrates a "wink" gesture of an eye area 400. The left portion of FIG. 4A shows the eye area 400 in an open state, the center portion shows the eye area 400 in a closed wink state, and the right portion shows the eye area 400 again in the open state. When the eye area 400 is in the closed "blink" state, the skin of the eyelids 402a-402b tends to be relatively flat. In contrast, when eye area 400 is in the closed "wink" state, the skin of the eyelids 402a-402b tends to have more wrinkles than it does in the closed blink state, making the skin less flat in the closed wink state than it is in the closed blink state.

In an embodiment, eye gesture detection system 300 focuses on areas 406a-406b of the eye area 400 such that light it emits is reflected from the areas 406a-406b. In this embodiment, when eye area 400 is in the open state, areas 406a-406b correspond to a surface of eye 404, whereas when eye area 400 is in the closed wink state, areas 406a-406b correspond to eyelids 402a-402b.

When eye area 400 is in the open state, the intensity of light reflected from areas 406a-406b tends to be relatively low (because the light is reflected from an eye tissue, as opposed to skin), whereas when eye area 400 is in the closed wink state, the intensity of light reflected from areas 406a-406b tends to be relatively high (because the light is reflected from skin). These light intensities form a light pattern that can represent the blink gesture. In the example discussed above, the light pattern of the "blink" gesture is characterized by light that has a relatively low intensity, followed by light that has a relatively high intensity, followed by light that has a relatively low intensity. The light intensity in the closed "wink" state tends to be even higher than the light intensity in the closed "blink" state, because the eyelids 402a-402b have more wrinkles in the closed wink state than they do in the closed blink state.

Figure 4B:
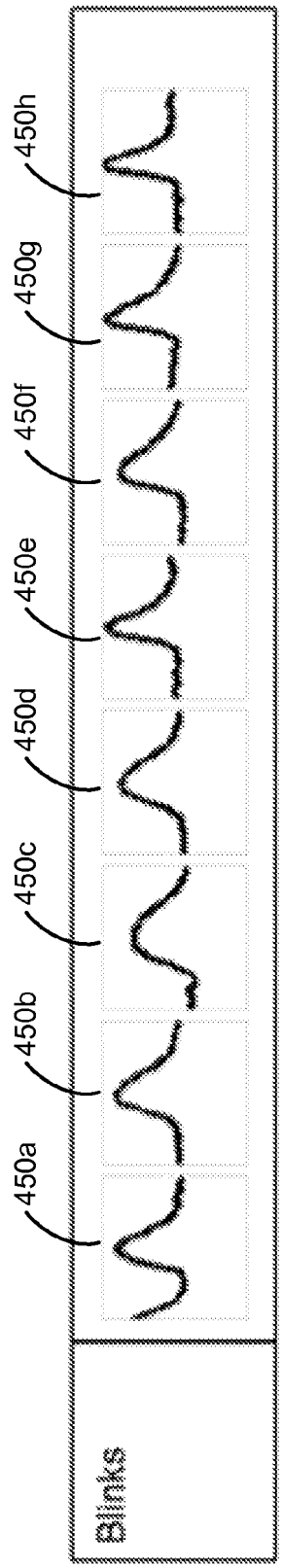
FIG. 4B illustrates example output data from the eye gesture sensing system while detecting wink gestures.

FIG. 4B illustrates light pattern samples 452a-452h, each of which represent a "wink" gesture. As shown in samples 452a-452h, each blink includes a "peak" pattern, characterized by a relatively low intensity, followed by increasing intensity over time, followed by decreasing intensity over time.

IV. Exemplary Operation

Figure 5:
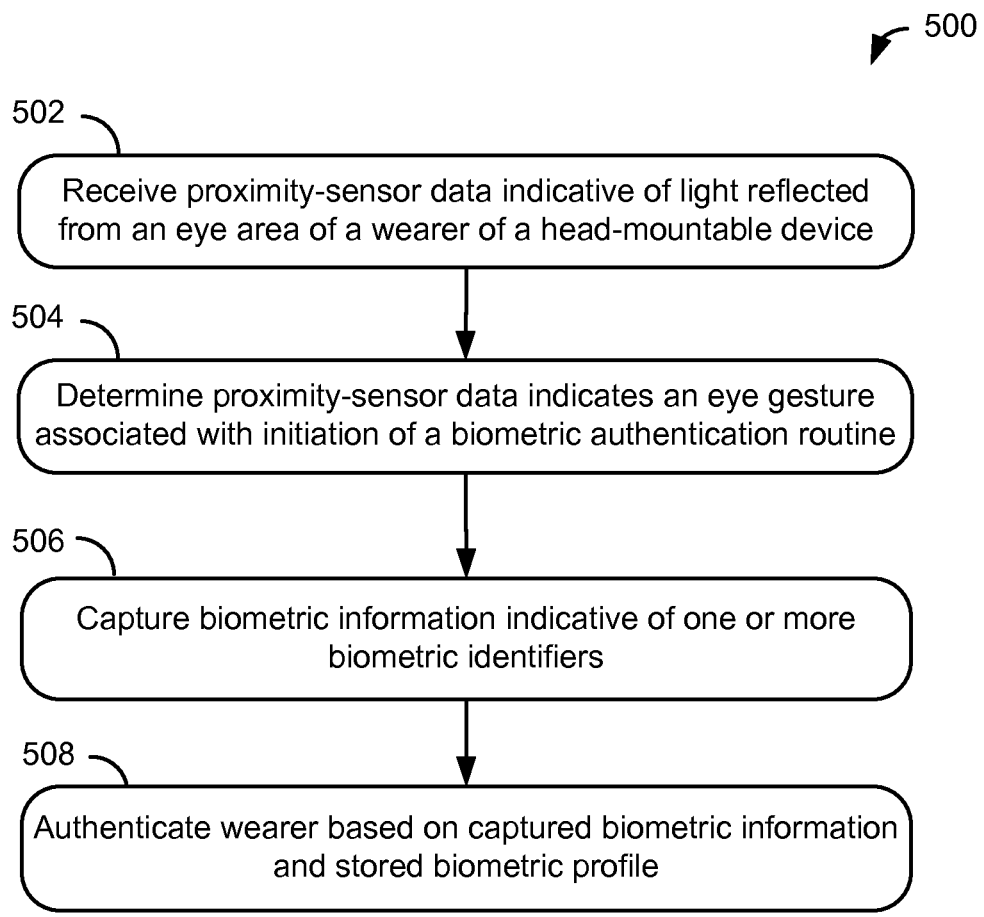
FIG. 5 illustrates an example process for authenticating a wearer of a head-mountable device upon detecting an eye gesture.

FIG. 5 is a flowchart of a method, in accordance with exemplary embodiments. As shown in FIG. 5, method 500 begins at block 502 with a head-mounted display receiving an indication of an eye gesture from at least one proximity sensor in a head-mountable device configured to generate sensor data indicative of light reflected from an eye area. At step 504, the head-mountable display determines whether the proximity-sensor data is indicative of an eye gesture associated with initiation of a biometric authentication routine. At step 506, the HMD captures biometric information indicative of one or more biometric identifiers of a wearer of the head-mountable device. And at step 508, the HMD authenticates the wearer of the head-mountable device based on the captured biometric information and based on a stored biometric profile.

A. Eye Gesture

Receiving an indication of an eye gesture at block 502 could include eye gesture detection system 300 receiving information characterizing a wink gesture of a wearer of wearable device 202, as described above with reference to FIGS. 3 and 4. Further, determining whether the proximity-sensor data is indicative of a biometric-authentication-routine-initiation eye gesture may include eye gesture characterization and recognition module 342 (executable by processor 330, for example) determining whether the eye gesture is a wink as described with reference to FIGS. 3 and 4, and not a blink or other eye gesture. And authenticating the wearer at block 508 could include eye gesture characterization and recognition module 342 comparing the information characterizing the wink gesture with an authorized wink gesture profile (which might be stored with eye gesture data 344 in memory 340). Those having skill in the art will understand that the above-described eye gestures (including the biometric-authentication-routine-initiation eye gesture) could be any eye gesture, not just a wink, and could be any combination of eye gestures, including a wink, a blink, a squint, and/or a horizontal or vertical eye movement, among numerous other examples.

B. Voice Recognition

Figure 6A:
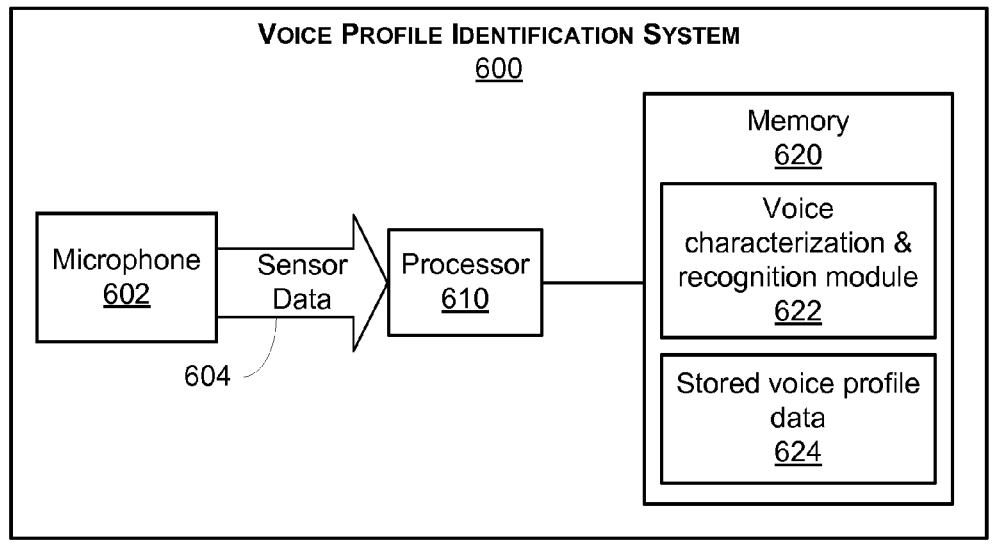
FIGS. 6A-6D illustrate example biometric identification systems for authenticating a wearer of a head-mountable device.

FIG. 6A illustrates an exemplary voice profile identification system 600. As shown, system 600 includes a microphone 602 and voice profile data 624 stored in a memory 620. A processor 610 can be a controller that receives the sensor data 604. Microphone 602 records and generates sensor data 604 (such as acoustic information) of a voice pattern. System 600 authenticates the wearer of the head-mountable device by comparing the recorded acoustic information with an authorized voice pattern profile included in profile data 644. The authentication (e.g., comparison) can be carried out according to executable instructions 622 for performing voice characterization and/or recognition stored in the memory 620. While executing the instructions 622 for the voice characterization and recognition module, the processor 610 can be a controller that is configured to receive the acoustic sensor data 604 generated by the microphone 602 and authenticate the user by determining whether the sensor data 604 is indicative of a voice pattern that corresponds with the stored voice profile data 624. While the voice characterization and recognition module is described in connection with executable instructions 622 stored in the memory 620, it is noted that the module can include both software and hardware components configured to provide the voice recognition functionality described herein.

In some embodiments, the voice recognition procedure can be initiated in response to detecting an eye gesture by an eye gesture sensor, such as the eye gesture sensor 300 described in connection with FIG. 3 above. Thus, the microphone 602 can begin recording acoustic signals in response to detection of an eye gesture, for example.

Comparing the recorded acoustic information with the authorized voice pattern could include determining that a string indicated by a fixed speech pattern or "password" (perhaps including a particular sequence of particular words) matches a string stored in the profile data. Additionally or alternatively, the comparison could include determining that particular words spoken in any order matches a set of words stored in the profile data. As another possibility, the comparison could include comparing any speech pattern with the profile data. Those having skill in the art will understand that other possibilities may exist as well without departing from the scope of the claims.

C. Hand Geometry

Figure 6B:
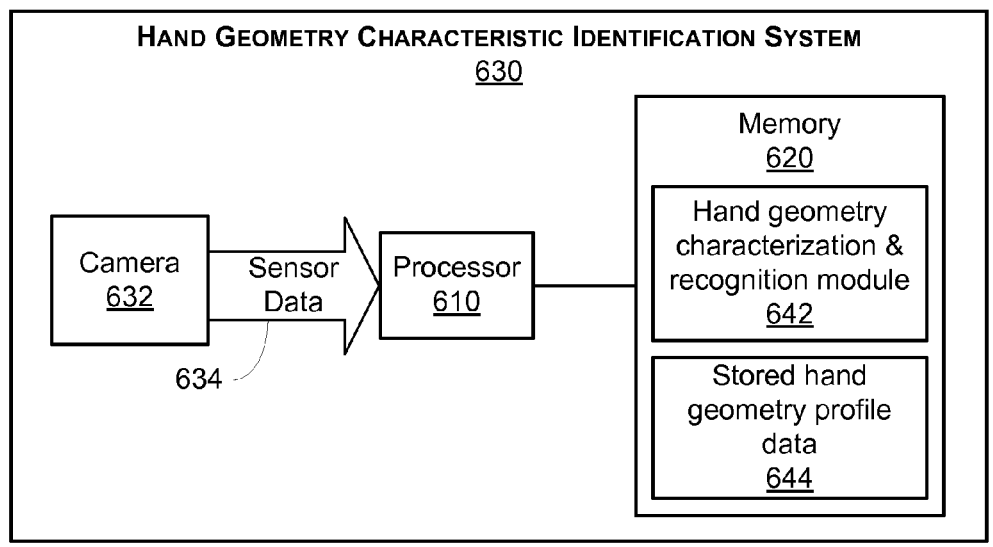

FIG. 6B. illustrates an exemplary hand geometry characteristic identification system 630. As shown, system 630 includes a camera 632 and hand geometry profile data 644 stored in the memory 620. Camera 632 detects and generates sensor data 634 indicative of a hand geometry characteristic (e.g., an image including the wearer's hand). System 630 authenticates the wearer of the head-mountable device by comparing the detected image indicative of the geometric characteristic of the hand with an authorized geometric characteristic profile included in profile data 644. The authentication (e.g., comparison) can be carried out according to executable instructions 642 for performing hand geometry characterization and/or recognition stored in the memory 620. While executing the instructions 622 for the hand geometry characterization and recognition module, the processor 610 can be a controller that is configured to receive the image data 634 generated by the camera 602 and authenticate the user by determining whether the image data 634 is indicative of a hand geometry characteristic that corresponds with the stored voice profile data 644. While the voice characterization and recognition module is described in connection with executable instructions 642 stored in the memory 620, it is noted that the module can include both software and hardware components configured to provide the voice recognition functionality described herein.

In an embodiment, system 600 measures the shape of the hand (including the width and length of the hand and fingers). Advantages of hand geometry biometric authentication are that it can be relatively fast (often less than five seconds) and could be used with either hand (regardless of which hand was originally used to generate the hand geometry profile data). While hands may not be as unique as fingerprints, hand geometry may be being sufficiently secure for authenticating an HMD wearer.

In some embodiments, the hand geometry recognition procedure can be initiated in response to detecting an eye gesture by an eye gesture sensor, such as the eye gesture sensor 300 described in connection with FIG. 3 above. Thus, the camera 632 can capture an image to generate the image data 634 in response to detection of an eye gesture, for example.

In the system 630, the shape and/or dimensions of the hand can be carefully measured and/or characterized, including measurements of the width and length of the hand and fingers and/or relative lengths and/or widths of fingers. Human hands are not nearly as unique as fingerprints, but hand geometry is easy and quick to measure, while being sufficiently robust for many authentication uses. However, hand geometry authentication alone may not be suitable for identification, since there would be many false matches.

One advantage of the hand geometry biometric authentication system 630 is that it is fast. For example, the system 630 can take less than one minute in the enrollment phase and less than five seconds in the recognition phase. Another advantage is that human hands are symmetric, so if the enrolled hand is, say, in a cast, the other hand can be used for recognition by placing it palm side up. In this sense, the system 630 is very robust. Some disadvantages of hand geometry include that it cannot be used on the young or the very old and has a relatively high equal error rate.

D. Speech Vibration

Figure 6C:
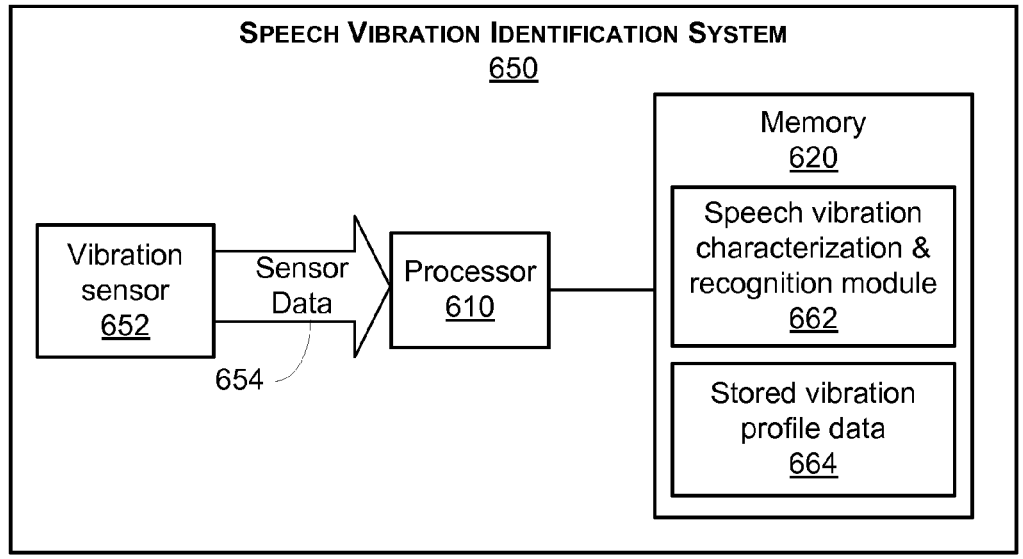

FIG. 6C illustrates an exemplary speech vibration identification system 650. As shown, system 650 includes a vibration sensor 652 (e.g., an accelerometer) and vibration profile data 664 stored in the memory 620. Vibration sensor 652 records and generates sensor data 654 (such as detected speech vibration information) of a speech vibration pattern. System 650 authenticates the wearer of the head-mountable device by comparing the detected speech vibration information 654 indicative of a speech vibration pattern with an authorized speech vibration profile contained in profile data 664. The authentication (e.g., comparison) can be carried out according to executable instructions 662 for performing speech vibration characterization and/or recognition stored in the memory 620. While executing the instructions 662 for the speech vibration characterization and recognition module, the processor 610 can be a controller that is configured to receive the speech vibration sensor data 654 generated by the vibration sensor 652 and authenticate the user by determining whether the vibration sensor data 654 is indicative of a speech vibration pattern that corresponds with the stored speech vibration profile data 664. While the speech vibration characterization and recognition module is described in connection with executable instructions 662 stored in the memory 620, it is noted that the module can include both software and hardware components configured to provide the voice recognition functionality described herein.

In some embodiments, the speech vibration recognition procedure can be initiated in response to detecting an eye gesture by an eye gesture sensor, such as the eye gesture sensor 300 described in connection with FIG. 3 above. Thus, the vibration sensor 652 can begin recording vibration information to generate the vibration sensor data 654 in response to detection of an eye gesture, for example.

In some examples, the vibration identification system 650 can be configured to detect vibrations resulting from a wearer speaking a characteristic authentication phrase. In such an embodiment, the speech vibration information detected with the vibration sensor 652 can be used in combination with the voice pattern information (e.g., from the voice recognition system 600) to authenticate the user (i.e., the wearer of the HMD).

E. Head Vibration

Figure 6D:
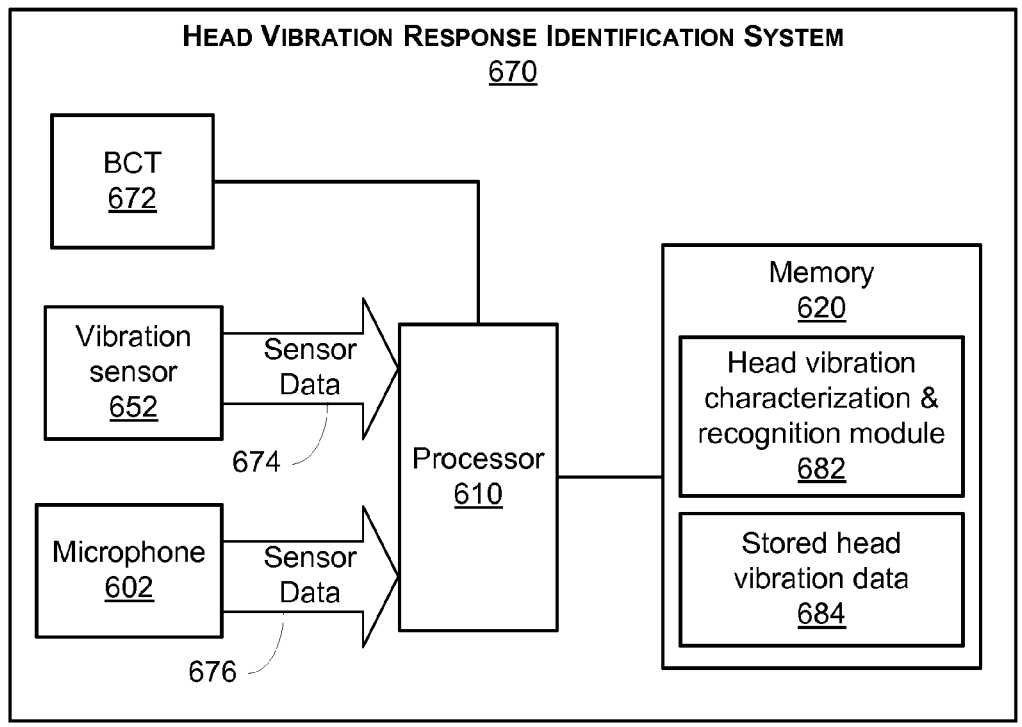

FIG. 6D illustrates an exemplary head vibration response identification system 670. As shown, system 670 includes a bone conduction transducer 672, a vibration sensor 652 (e.g., an accelerometer), a microphone 602, and head vibration profile data 684 stored in the memory 620. System 670 causes bone conduction transducer 672 to vibrate. For example, the bone conduction transducer 672 can be situated in an HMD so as to be placed against a bony portion of the user's head so as to allow vibrations from the bone conduction transducer 310 to propagate through the user's head, and resulting vibrations can be detected via the vibration sensor 652 and/or microphone 602 at another location on the HMD. Vibration sensor 652 detects and generates vibration sensor data 674 indicative of a vibration pattern. Additionally or alternatively, microphone 602 records and generates sensor data 324 indicative of the vibration pattern, such as acoustic information. In some examples, both the microphone 602 and the vibration sensor 652 can generate sensor data indicative of the vibrations from the bone conduction transducer 672, but at different frequency ranges. For example, the microphone 602 may sense a higher frequency range than the vibration sensor 652.

System 670 authenticates the wearer of the head-mountable device by comparing the detected vibration information 674 and/or acoustic information 676 (which can each be indicative of a head vibration response pattern) with an authorized head vibration response profile contained in profile data 684. The authentication (e.g., comparison) can be carried out according to executable instructions 682 for performing head vibration response characterization and/or recognition stored in the memory 620. While executing the instructions 682 for the head vibration response characterization and recognition module, the processor 610 can be a controller that is configured to receive the head vibration response data 674 and 676 generated by the vibration sensor 652 and microphone 602, respectively, and authenticate the user by determining whether the head vibration response data 674, 676 is indicative of a head vibration response pattern that corresponds with the stored head vibration response profile data 684. While the head vibration response characterization and recognition module is described in connection with executable instructions 682 stored in the memory 620, it is noted that the module can include both software and hardware components configured to provide the head vibration response characterization and recognition functionality described herein.

In some embodiments, the head vibration response recognition procedure can be initiated in response to detecting an eye gesture by an eye gesture sensor, such as the eye gesture sensor 300 described in connection with FIG. 3 above. Thus, the bone conduction transducer 672 can begin vibrating and the vibration sensor 652 and/or microphone 602 can begin recording their respective sensor data 674, 676 in response to detection of an eye gesture, for example.

In some examples the bone conduction transducer 310 can thus providing a vibration input signal that is transmitted through the user's head and the response can be measured via the vibration sensor 610. The measurement of the head vibration response pattern provides a biometric identifier, because the received vibration information depends on the relative arrangement of vibration-transmitting bony structures and vibration-absorbing soft tissues in the user's head. Thus, the response of a particular user's head (measured by the vibration sensor 610) to the vibration input signal (provided by the bone conduction transducer 310) can be characterized and used to identify authenticate a user.

With reference again to FIG. 5, wearable device 202 performs a computing action in response to authenticating the wearer. The computing action could include "unlocking" the wearable device, thus allowing the wearer to access functionality and/or data that was previously restricted. Additionally or alternatively, the computing action could include the wearable device storing the time and/or date that the wearer authenticated with the wearable device 202, and/or sending a communication to remote device 250 indicating that the wearer has authenticated with the wearable device. Those having skill in the art will recognize that other computing actions may be performed as well.

In some embodiments, a HMD can include one or more of the biometric authentication systems 600, 630, 650, 670 described in connection with FIGS. 6A-6D above to characterize and recognize biometric characteristics of a wearer of the HMD and thereby authenticate the wearer. In some examples, multiple such biometric authentication systems can be employed in combination to authenticate a wearer only when multiple biometric characteristics are determined to correspond with a stored biometric profile.

Figure 7:
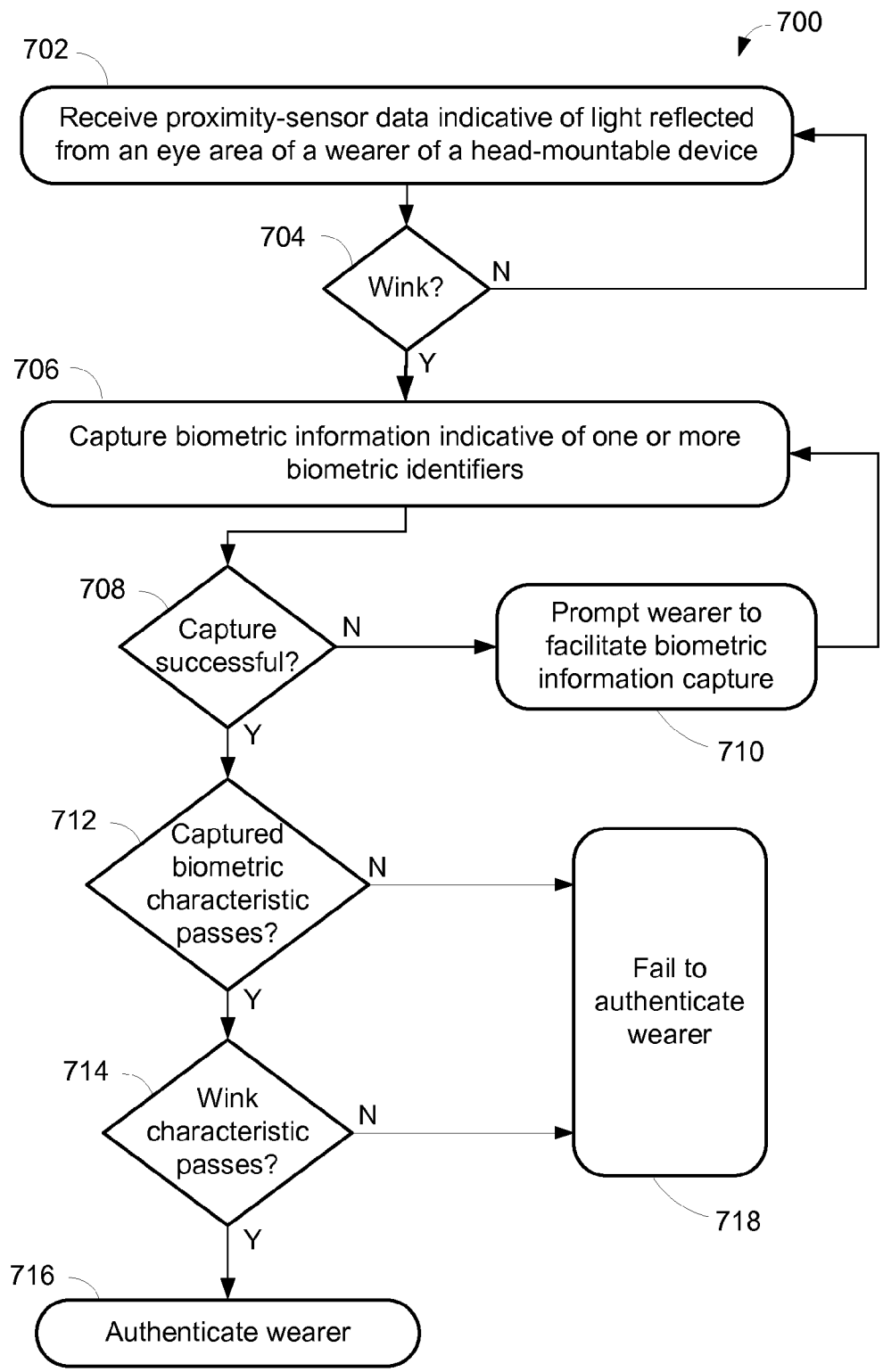
FIG. 7 illustrates an example process for authenticating a wearer of a head-mountable device in accordance with both a wink characteristic and another biometric characteristic.

FIG. 7 is a flowchart of a method 700, in accordance with exemplary embodiments. As shown, method 700 begins at block 702 with head-mountable device (e.g., the head mountable devices discussed in connection with FIGS. 1-2 above) receiving proximity-sensor data indicative of light reflected from an eye area of a wearer of a hound mountable device. At block 704, head-mountable device x determines whether the reflected light is indicative of a wink. If not, the method returns to block 702. If the head-mountable device determines that the reflected light is indicative of a wink at block 704, then at block 706, the head-mountable device captures biometric information indicative of one or more biometric identifiers. Otherwise, the head-mountable device waits to receive addition proximity-sensor data at block 702.

At block 708, the head-mountable device determines whether the device successfully captured the biometric information. If not, then the head-mountable device prompts the wearer to facilitate the capture at block 710.

Figure 8B:
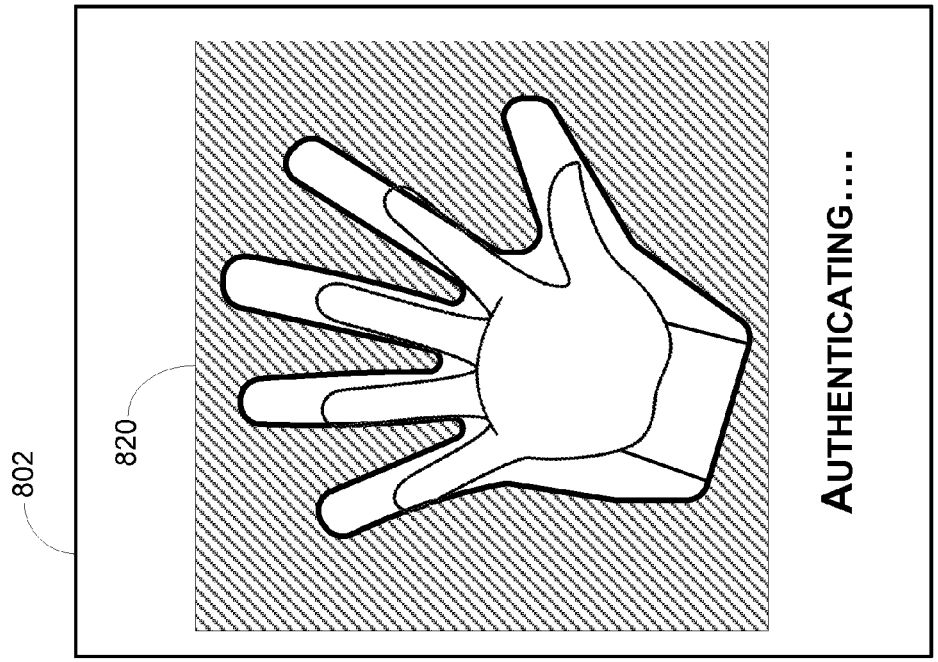
FIGS. 8A-8B illustrate an example of prompting a user to facilitate capture of biometric information.
Figure 8A:
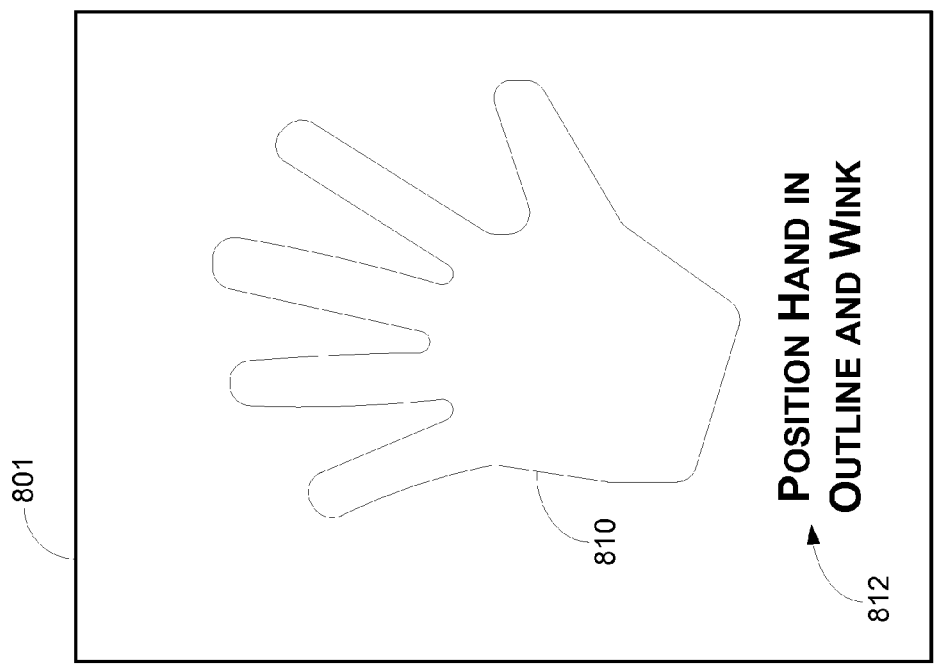

FIGS. 8A and 8B illustrate an example of a head-mountable-device display prompting the wearer to facilitate the capture of the biometric information. As shown in FIG. 8A, in example screen shot 801, the head-mountable device displays a prompt with text instructions 812 to instruct the user to position their hand within the indicated hand outline 810. The location of the hand outline 810 can be selected such that a hand positioned within the outline 810 is in a line of sight of a front facing camera mounted on the HMD (e.g., the camera 120 on the HMD 100 described in connection with FIG. 1A). The text instructions 812 can also prompt the user to capture an image of the hand, such as by winking, which can be detected by proximity sensor to activate a front facing camera to capture an image of the hand. In some examples, the HMD can be configured to automatically capture an image upon detecting the hand in the hand outline region 810 without requiring the user to wink. Screen shot 802 shown in FIG. 8B illustrates a view when the user has placed their hand in the hand outline 810. In some examples, the HMD can be configured to visually indicate that the hand is placed in the proper region of the hand outline 810 by showing a contrasting color surrounding the hand outline 810 (e.g., the contrasting color block 820) and/or by displaying text to indicate that the authentication process is being carried out. In some examples, the HMD can also be configured to determine whether the captured image lacks sufficient brightness and/or contrast for further hand geometry recognition processing and provide appropriate text prompts to direct the user to reposition their hand, move out of the sun, etc. Such image sufficiency processing can include edge detection procedures, for example.

After prompting the user at block 710, then at block 706, the head-mountable device again attempts to capture the biometric information. As discussed above, FIG. 8B is a screen shot 802 illustrating an example head-mountable-device display indicating the status of biometric information re-capture.

Upon the device successfully capturing the biometric information, then at block 712, the head-mountable device determines whether the comparison between the captured biometric information and the stored profile data indicates that the wearer should be authenticated. If the wearer "passes" the comparison at block 712, then at block 714, the head-mountable device determines whether a comparison between the captured wink characteristic and the stored wink gesture profile indicates that the wearer should be authenticated. If the wearer "passes" the comparison at block 714, then at block 716, the head-mountable device authenticates the wearer. However, if the wearer does not pass the comparison at either block 712 or 714, then at block 718, the head-mountable device fails to authenticate the wearer.

Figure 9:
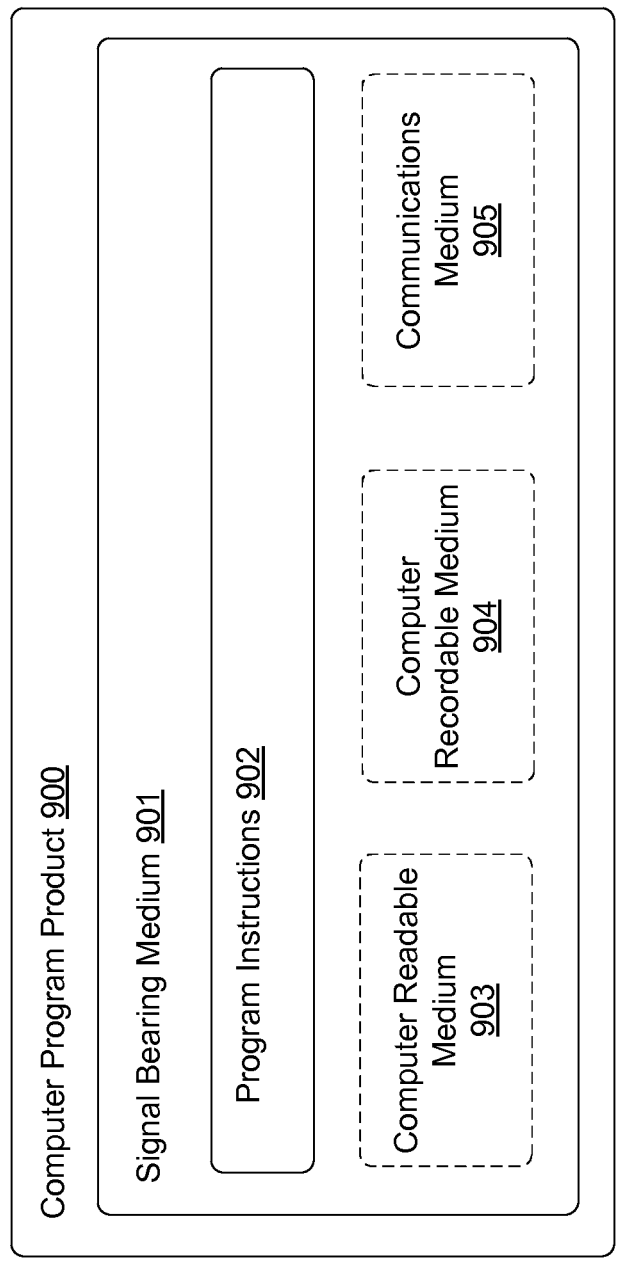
FIG. 9 illustrates an example of a computer program product.

FIG. 9 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions stored on data storages of the head-mountable devices and/or servers described above). FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. In some examples, the signal bearing medium 901 can be a computer-readable medium 903, such as, but not limited to, a hard disk drive, a Compact Disc (CD), a Digital Video Disk (DVD), a digital tape, memory, etc. In some implementations, the signal bearing medium 901 can be a computer recordable medium 904, such as, but not limited to, memory, read/write (R/W) CDs, R/W DVDs, etc. In some implementations, the signal bearing medium 901 can be a communications medium 905, such as, but not limited to, a digital and/or an analog communication medium (e.g., a fiber optic cable, a waveguide, a wired communications link, a wireless communication link, etc.). Thus, for example, the signal bearing medium 901 can be conveyed by a wireless form of the communications medium 905.

The one or more programming instructions 902 can be, for example, computer executable and/or logic implemented instructions. In some examples, a computing device such as one or more of the mobile devices and/or servers of FIGS. 1-2 are configured to provide various operations, functions, or actions in response to the programming instructions 902 conveyed to the computer system by one or more of the computer readable medium 903, the computer recordable medium 904, and/or the communications medium 905.

The non-transitory computer readable medium could also be distributed among multiple data storage elements, which could be remotely located from each other. The computing device that executes some or all of the stored instructions could be a processing system associated with a head-mountable device illustrated in FIG. 1. Additionally or alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
    receiving an indication of an eye gesture from at least one proximity sensor in a head-mountable device (HMD) configured to generate sensor data indicative of light reflected from an eye area;
    responsive to receiving the indication of the eye gesture, (i) vibrating a bone conduction transducer associated with the HMD near a bony portion of a head of a wearer of the HMD so as to transmit vibrations through the head of the wearer, and (ii) capturing biometric information indicative of a head vibration response pattern of the vibrations transmitted through the head of the wearer of the HMD, wherein the captured biometric information comprises one or more of vibration information from an accelerometer associated with the HMD and acoustic information from a microphone associated with the HMD; and
    authenticating the wearer of the HMD based on a comparison of the head vibration response pattern indicated by the captured biometric information and a stored head vibration response profile.

2. The method according to claim 1, wherein the receiving the indication of the eye gesture includes receiving information characterizing a wink gesture of the wearer, and wherein the authenticating the wearer includes:
    comparing the head vibration response pattern indicated by the captured biometric information with the stored head vibration response profile,
    comparing the information characterizing the wink gesture with an authorized wink gesture profile, and
    determining that the wearer is authorized only if both the head vibration response pattern indicated by the captured biometric information corresponds to the stored head vibration response profile and the information characterizing the wink gesture corresponds to the authorized wink gesture profile.

3. The method according to claim 1, further comprising:
    responsive to authenticating the wearer, causing the HMD to perform a computing action.

4. The method according to claim 3, wherein the computing action includes unlocking the HMD.

5. A head-mountable device (HMD) comprising:
    an eye gesture detection system including at least one light source configured to illuminate an eye area and at least one proximity sensor configured to generate sensor data indicative of light reflected from the eye area;
    a head vibration response pattern characterization system including a bone conduction transducer configured to vibrate near a bony portion of a head of a wearer of the HMD so as to transmit vibrations through the head of the wearer, and at least one sensor configured to generate data indicative of a head vibration response pattern of the vibrations transmitted through the head the wearer of the HMD, wherein the at least one sensor comprises one or more of an accelerometer associated with the HMD and configured to generate vibration data and a microphone associated with the HMD and configured to generate acoustic data; and
    a controller configured to: (i) receive an indication of an eye gesture from the eye gesture detection system; (ii) responsive to receiving the indication of the eye gesture, cause the head vibration response pattern characterization system to: (a) vibrate the bone conduction transducer so as to transmit vibrations through the head of the wearer, and (b) capture biometric information indicative of the head vibration response pattern of the vibrations transmitted through the head of the wearer of the HMD; and (iii) authenticate the wearer of the HMD based on a comparison of the head vibration response pattern indicated by the captured biometric information and a stored head vibration response profile.

6. The HMD according to claim 5, wherein the indication of the eye gesture received from the proximity sensor includes information characterizing a wink gesture of the wearer, and wherein the controller is further configured to authenticate the wearer by:

comparing the head vibration response pattern indicated by the captured biometric information with the stored head vibration response profile, comparing the information characterizing the wink gesture with an authorized wink gesture profile, and determining that the wearer is authorized only if both the head vibration response pattern indicated by the captured biometric information corresponds to the stored head vibration response profile and the information characterizing the wink gesture corresponds to the authorized wink gesture profile.

7. The HMD according to claim 5, further comprising a display system, and wherein the controller is further configured to, responsive to failing to capture the biometric information via the head vibration response pattern characterization system, display a prompt to facilitate capture of the biometric information on the display system such that the prompt is visible to the wearer.

8. A non-transitory computer readable medium storing instructions that, when executed by one or more processors in a computing device, cause the computing device to perform operations, the operations comprising:

receiving an indication of an eye gesture from at least one proximity sensor in a head-mountable device (HMD) configured to generate sensor data indicative of light reflected from an eye area;

responsive to receiving the indication of the eye gesture, (i) vibrating a bone conduction transducer associated with the HMD near a bony portion of a head of a wearer of the HMD so as to transmit vibrations through the head of the wearer, and (ii) capturing biometric information indicative of a head vibration response pattern of the vibrations transmitted through the head of the wearer of the HMD, wherein the captured biometric information comprises one or more of vibration information from an accelerometer associated with the HMD and acoustic information from a microphone associated with the HMD; and authenticating the wearer of the HMD based on a comparison of the head vibration response pattern indicated by the captured biometric information and a stored head vibration response profile.

9. The non-transitory computer readable medium according to claim 8, wherein the receiving the indication of the eye gesture includes receiving information characterizing a wink gesture of the wearer, and wherein the authenticating the wearer includes:

comparing the head vibration response pattern indicated by the captured biometric information with the stored head vibration response profile, comparing the information characterizing the wink gesture with an authorized wink gesture profile, and determining that the wearer is authorized only if both the head vibration response pattern indicated by the captured biometric information corresponds to the stored head vibration response profile and the information characterizing the wink gesture corresponds to the authorized wink gesture profile.

\* \* \* \* \*